(12) United States Patent
Carstensen (10) Patent No.: US 8,496,273 B1
(45) Date of Patent: Jul. 30, 2013

(54) PRESSURE AND CORROSION-RESISTANT COUPLINGS FOR OIL FIELD TUBING

(76) Inventor: Kenneth J. Carstensen, Houston, TX (US)

( * ) Notice: Subject to any disclaimer, the term of this patent is extended or adjusted under 35 U.S.C. 154(b) by 686 days.

(21) Appl. No.: 12/543,909

(22) Filed: Aug. 19, 2009

(51) Int. Cl.
*F16L 25/00* (2006.01)
(52) U.S. Cl.
USPC ............ 285/333; 285/334.4; 285/334.3; 285/334.2
(58) Field of Classification Search
USPC ............ 285/110, 295.2, 295.3, 333, 334, 285/334.4, 355, 334.3, 334.2
See application file for complete search history.

(56) References Cited

U.S. PATENT DOCUMENTS

| 2,122,757 | A | * | 7/1938 | Scott | 285/334 |
| 3,266,821 | A | * | 8/1966 | Safford | 285/40 |
| 4,509,776 | A | * | 4/1985 | Yoshida et al. | 285/55 |
| 6,273,474 | B1 | * | 8/2001 | DeLange et al. | 285/55 |
| 6,863,313 | B1 | * | 3/2005 | DeLange et al. | 285/55 |

* cited by examiner

*Primary Examiner* — David E Bochna
(74) *Attorney, Agent, or Firm* — Mattingly & Malur, P.C.

(57) ABSTRACT

An improved reemployable tubular connection system and method for oil field application disposes an axially asymmetric seal in a coupling sleeve interconnecting the oppositely entered pin ends of two tubing sections. The sleeve includes an approximately central interior surface for seating a deformable seal having oppositely directed tapered edges with different angles of convergence. The pin ends enter into and resiliently displace the edges of the seal, which may be made differentially adhesive so that a tubing connection may be broken and remade a number of times.

14 Claims, 7 Drawing Sheets

PRESSURE AND CORROSION-RESISTANT COUPLINGS FOR OIL FIELD TUBING

REFERENCE TO PRIOR APPLICATION

This application relies for priority on the previously filed provisional application of the same title filed by Kenneth J. Carstensen on Sep. 4, 2008, Ser. No. 61/190,145.

FIELD OF THE INVENTION

This invention relates to improvements in oil field pipe assemblies having threaded and coupled end areas for use in demanding conditions, and more particularly to coupling configurations which employ internally plastic coated or fiberglass lined tubings and casings.

BACKGROUND OF THE INVENTION

In the development of improved methodologies to meet the ever-increasing demands for the production of petroleum hydrocarbons, improved tubing systems have been developed for use at great drilling depths, in directionally drilled wells, and in ever increasing very corrosive high pressure and temperature operational environments. There are constant needs to meet such increasingly demanding reliability requirements under ever more stringent field conditions.

Two broadly different present categories of such improved systems are generally recognized, namely, those which, on the one hand, meet standards set by the American Petroleum Institute (API) and those which, on the other hand, meet specialized, usually more exacting standards, usually commercialized as "premium" products. The latter group is necessarily more costly, and seldom economically viable for general usage, so although the concepts presented here may find application in premium products, this invention is primarily directed to tubular goods that meet particularized API standards.

API standard products must meet known tolerances and design characteristics, so they are consequently interchangeable, less costly, and available in quantity. They are therefore preferred for use wherever field conditions permit. In order to gain the longest working life and best economic case, some API tubing and casing, when used in corrosive environments, are internally plastic coated (IPC) and others insert fiberglass liners (FGL). As technology has developed to extract oil from fields which are less accessible, more stressful conditions have had to be met and overcome, including operating at increasingly greater drilling depths and under even less favorable production conditions.

Different problems are presented by W/AG (water/alternating gas) systems for recovery of additional hydrocarbons by the injection of water and $CO_2$ gas into fields in which production has dwindled to near nothing or which have otherwise ceased to produce. This has led to increasing adoption of the internally coated and fiberglass lined tubing systems, to provide tubing strings which not only can withstand high pressures and temperatures, but which can also resist corrosion and chemical attack. Placing such products in use, in turn, has revealed a number of other problems and weaknesses. For example, applying a protective coating adapted for its chemical resistance to attack often also led to threaded end area non-uniformities. Such coatings have to be applied by spraying, which more or less inevitably has tended to introduce disparities between coating thickness at the crest and root areas of the threads. Moreover, the stresses within a threaded joint vary with the local physical strength of segments of the joint, since the relatively thinner cross-sections of pin ends are likely to deflect more than the thicker opposing sections of the associated coupling sleeve during makeup and joint tightening. Minute but significant surface imperfections can then appear in the coatings and these imperfections can be attacked by pressurized corrosive gases. Moreover, continued or repeated makeup of a coupling may introduce hairline cracking which can affect not only the integrity of a coating or lining, but also the physical strength of a threaded joint. In consequence, even though the lined or coated tubing and coupling combinations are intended for repeated engagement and disengagement, these and other problems have militated against satisfactory performance under repeated use.

Workers in the art therefore have sought to introduce special techniques for improving sealing performance. Perhaps the most commonly used is a product called "Coupling Guard"™ a product of Tuboscope Inc. which is formulated of an epoxy, PTFE, and "Ryton"™, a liquid mix which is applied to an interior central length of the central region of a coupling and is subsequently thermally treated to accelerate solidification and curing. The liquid properties of the mix and the inherent shrinkage following the heating and curing process can introduce irregularities between the thickness of the thread crest coatings in comparison to the thickness at the thread roots. Consequently, there can be a proclivity toward thread damage under makeup conditions, and thread damage and deformation because of differentials in pin end radial compression. If stresses exceed the capability of a material beyond what it can resist, the deformation will introduce cracking of the plastic coating. Damage and loss of corrosion protection also occur from successive makeup and breakout of the connections.

Another connection for internally plastic coated pipe is sold by Hunting Energy Services, of Houston, Tex. as the "KC-MMS Connection"™ and uses an interior ring seal centrally set into an interior circumference of a coupling. The ring seal includes an index tongue on the coupling internal diameter and a matching outer groove on the outer surface of the seal. Tapered side wings on the ring engage the pin end faces inserted into the coupling. Central sealing requires both precision marking and subsequent makeup steps, often difficult to achieve under practical field circumstances. For example, the "KC-MMS Connection" must be aligned relative to "timing" or "makeup marks" on the connection, which alignment is time consuming and difficult to achieve in the field and if not performed properly can result in widely varying final makeup torque. Moreover, the "MMS" type of sealing connection can encounter problems during assembly, from hydraulic deformation and displacement of the thread lube as the pin is being driven into the coupling. Also, the thread lube can be forced into the space between the wing of the resilient seal and the coupling and impelled by hydraulic forces out of its groove.

These and other problems are exacerbated during production when high pressure injection tubing has to be withdrawn from the downhole installation and run back in, as for regular maintenance or replacement or repair. This is commonly known in the industry as "tripping the pipe". It is preferred to be able to do this at least 8-10 times, although practical experience has shown that this is seldom feasible. This is true because such conditions as thread deformation, pin end compressive deformation and coupling bell-out exist and impede establishing the torque level in the connection that is needed for adequate strength.

Consequently, some existing very expensive premium internally plastic coated and fiberglass lined pipe connections have been designed to confront the problem of providing adequate pressure containment and corrosion resistance. However, economic and operative advantages can be realized if baseline, economical, API threaded and coupled connection products can be widely used under the previously stated more stringent conditions and still furnish all the operative reliability and repeatability that is required.

SUMMARY OF THE INVENTION

An internally lined or coated connection for use with production and high pressure injection tubing, such as (for example) 2⅞" or 3½" diameter tubing incorporates a homogeneous central seal such as a non-fiber reinforced Teflon body engaging both pin ends within a coupling. The seal is in the form of a ring with asymmetry between the shapes and lengths of its two lengthwise ends. The seal body lies slightly longitudinally offset, within a generally central but precisely offset seating span of constant diameter of the coupling, adjacent the female threaded ends of the coupling. When the two compatibly shaped male threaded pin ends of tubing are threaded into the opposite ends of the coupling the pin ends each engage into the adjacent and different specifically shaped axially converging edges or end sections of the central "Teflon" ring. The seal end section on the mill or plant makeup side includes a shorter, relatively steeper taper radius than the other seal end section, on the field makeup side, which has a longer shallower taper. The tapers are angled to converge toward the adjacent end in a predetermined proportion, and the ratio can be dependent on the specific API coupling that is being used. The pin ends can be shaped to have bullet nose configurations, but in any event the initial threads engage into and deform the interior sides or angled surfaces of the end sections of the seal ring, which they separately engage. To insure proper displacement of the pin end stabbing chamfer, the first 1½ to 2½ starting thread areas tap into the resilient Teflon seal material, thus establishing the initial compression of the resilient material necessary to effect a high pressure seal mechanism. The threads are processed to have finished polished surfaces which receive an interior coating for engagement with the opposed segment of seal surface.

As in typical assembly operations, the coupling including the interior seal is bucked on at the plant, here with the pin end being made up at the short radius side with inserted mill end tubing. A retainer tool may be inserted from the opposite side to hold the seal in position as the tubing is driven in. The threads of the pin end penetrate into and deform the "Teflon" seal material such that volumetric displacement occurs in a predeterminable range. This tolerable deformation permits shape recovery that is adequate to assure restoration of contact pressure on multiple makeups, when such are called for. In the field, when the full coupling is made up, the pin end of the field tubing engages into the seal at the tapered end section which is at a flatter angle. Again, the volumetric displacement of the seal material is limited to a predetermined amount. This combined with the innate resiliency of "Teflon" assures that the integrity of the seal will be retained on repeated breakouts of the coupling. In engagements after successive breakouts, the inserted tubing end penetrates to a cumulative depth that increases with successive engagements, but the added increments diminish with repetition. The configuration also provides improved sealing and corrosion barrier protection for API connections on internally plastic coated (IPC) pipe and fiberglass lined pipe.

Seals in accordance with the invention are also advantageously useful with fiberglass lined (FGL) pipe connections. In this exemplification, however, the connection includes a "bonding slurry" layer interposed between the facing circumferences of the liner and pipe, and also between the pipe end face and the central seal. On full makeup, the field side pin end displaces the seal on that side, forcing it into the pin end threads and establishing the desired asymmetry. In the FGL version the central ridge section of the seal preferably is volumetrically displaced sufficiently such that its inner diameter is substantially flush with the inner diameter of the lined tubing.

Methods for employing this configuration are simple, readily accomplished and practical. Prior to assembly of the mill pin end of the tubing to the coupling, a circumferential demarcation line of precision width is applied to each end of the tubing to establish dimensional thread engagement positions for plant makeup and for first field makeup. A light coat of a fast curing sealant is applied to the mill pin end threads and to the internal threads at the plant makeup side of the coupling. The coupling can then be bucked-on to a dimensional position in which the previously implanted line is lined up with the outside shoulder of the coupling. The sealant increases sealing capability of the threads and also increases breakout torque so that only the field side of each connection will disengage when the tripping operation is properly carried out. The tubing end inserted in the field initially is also inserted to the demarcation line depth, but subsequent makeups are to greater depths and are defined by torque limits.

Seals in accordance with the present invention have separate utility in connections that do not employ either internally coated tubing or fiberglass lined tubing, because of the continuity in flow they impart to the system. By incorporating the presently disclosed seals in the connections, the resistance to high pressure differentials across the joints is increased and sealing is improved. At the same time, the seal is more resistant to internal turbulence in the tubing, and thereby improves operative characteristics of the tubing string.

BRIEF DESCRIPTION OF THE DRAWINGS

A better understanding of the invention may be had by reference to the following description, taken in conjunction with the accompanying drawings, in which.

DETAILED DESCRIPTION OF THE INVENTION

Figure 1:
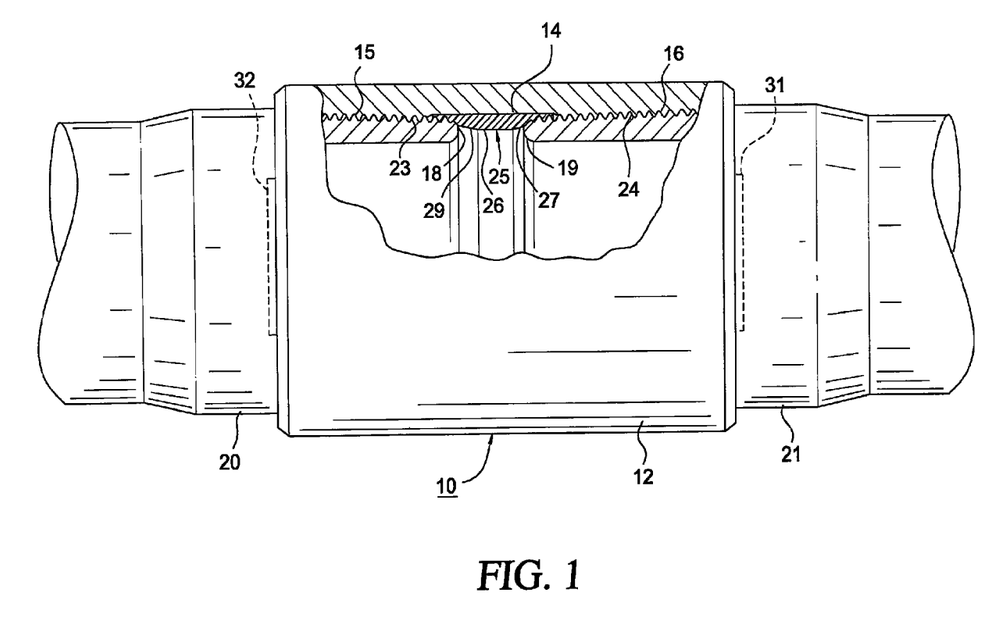
FIG. 1 is a perspective view, partially broken away, of an IPC connection in accordance with the invention.
Figure 2:
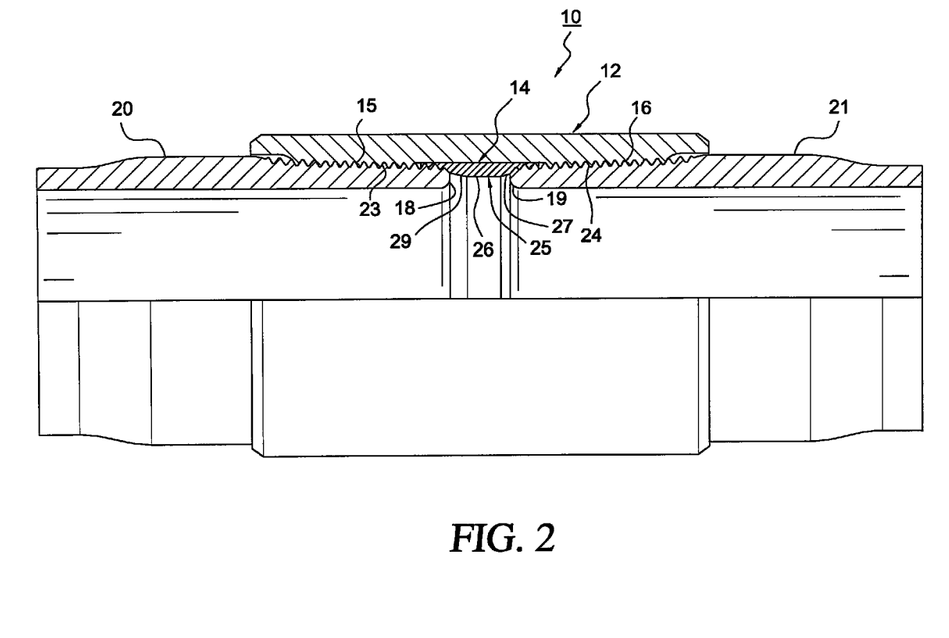
FIG. 2 is a cross-sectional side view of the connection of FIG. 1.
Figure 3:
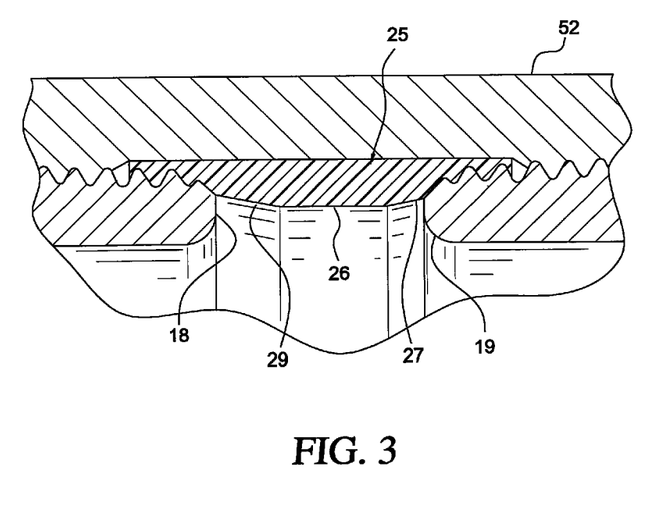
FIG. 3 is an enlarged fragmentary view in section, showing further details of the construction of FIGS. 1 and 2.

As seen in FIGS. 1-3, a pipe connection 10 is shown that is in conformity with API standards and can meet the demanding corrosive high temperature conditions that often exist at substantial depths and otherwise. A distinction is made in the industry between API couplings, which are made in accordance with predetermined industry standards set by the America Petroleum Institute, and "premium" couplings, which typically are more precise, intended for specific purposes and consequently substantially more expensive and not interchangeable with API connections. Illustrated herein are typical and widely used examples of tubing connections, as in API 2⅞" 8 rnd and 3½" 8 rnd. The connection 10 includes a sleeve coupling 12 with internal threaded sections at each end in accordance with the chosen thread, whether round or buttress. The product depicted in FIGS. 1-3 provides an example of an IPC type-connection 10 evolved over time in the course of industry efforts to meet corrosion and durability problems, but specifically improved, as described hereinafter, by employing seal elements, coatings, and lubricants in both novel and conventional ways. In this example, the coupling sleeve 12 includes a approximately central section 14 of constant interior diameter, between and merging into the female thread sections 15, 16 on each side. The constant I.D. span 14 is longitudinally offset from the true longitudinal center of the coupling 12, here by a fraction of an inch, for this example. The pin ends 18, 19 of two separate and opposite tubing elements 20, 21 are threaded into the associated female threads of the coupling sleeve 12, with the exterior male threads 23, 24 of the pins engaging into the female threads 15, 16 respectively of the sleeve 12. The first and second pin ends 18 and 19 respectively are of API standard configuration. The first pin end 18 will be referred to as being on the field makeup side, so the second pin end 19 is on the mill makeup side. In conventional fashion for such applications, the pin ends 18 and 19 have been prepared by machining the flat pin ends to a rounder, "bullet nose" configuration, which is more amenable than flat pin end shapes to coating and concomitant processing steps. Moreover, the pin ends 18 and 19, including the threaded sections, are typically blasted with "Garnett" abrasive to form an anchor pattern on the steel surfaces of the pin ends and provide maximum mechanical adhesion of the coating.

In the connection 10, the generally central flat ID section 14 of the sleeve 12 receives and retains a polymeric seal 25 in the form of a ring occupying a generally central but slightly longitudinal offset position with its outer diameter engaged against the span 14 between the threaded sections 15, 16. This generally central seal 25 has asymmetric tapered edge sections 27, 29 extending axially and each converging to a terminal edge from a flat (i.e. constant diameter) central section 26. The flat (constant radius) span or section 14 in the mid-region of the inner diameter of the sleeve 12 is referred to as "generally central" to denote that it is slightly offset, in this example by ⅛" from the true longitudinal center of the sleeve 12. The particular asymmetry of the seal 25 is configured to accept differential penetrations of the male threaded ends 23, 24 of tubing separately inserted from opposite directions, as described hereafter. Note that the female threads 15, 16 in the sleeve 12 commence at the extremity of the slightly offset flat section 14 and continue axially to each proximate end of the sleeve 12. Each tapered edge section 27, 29 of the seal 25 is thus within, engaged and locally deformed by a different pin end 18, 19 of a tubing element 20, 21. The seal 25 itself is of uncoated, non-impregnated and non-reinforced "Teflon". The tapered edge section 27 on the mill end side converges at a first predetermined taper angle from an essentially uniform inner diameter section 26 of the seal 25, and is relatively steeper than the converging taper tapered edge section 29 on the field end side. For a 2⅞" tubing, the tapered section 27 on the mill side is an angle of approximately 10-12° to the centerline, while on the field side the taper angle on the tapered edge section 29 is about 18-19° to the centerline. In this example, there is thus a differential of ⅛" between the axial lengths of the tapered edge 27 of the mill end side (which is shorter) and the tapered edge 29 on the field end side. The differential in length is of significant benefit in practice, because of the fact that the mill end side essentially is held static while a succession of breakout and makeups are effected on the field end side, as described further hereafter.

Installation and Functioning of the Systems of FIGS. 1-3

Figure 7:
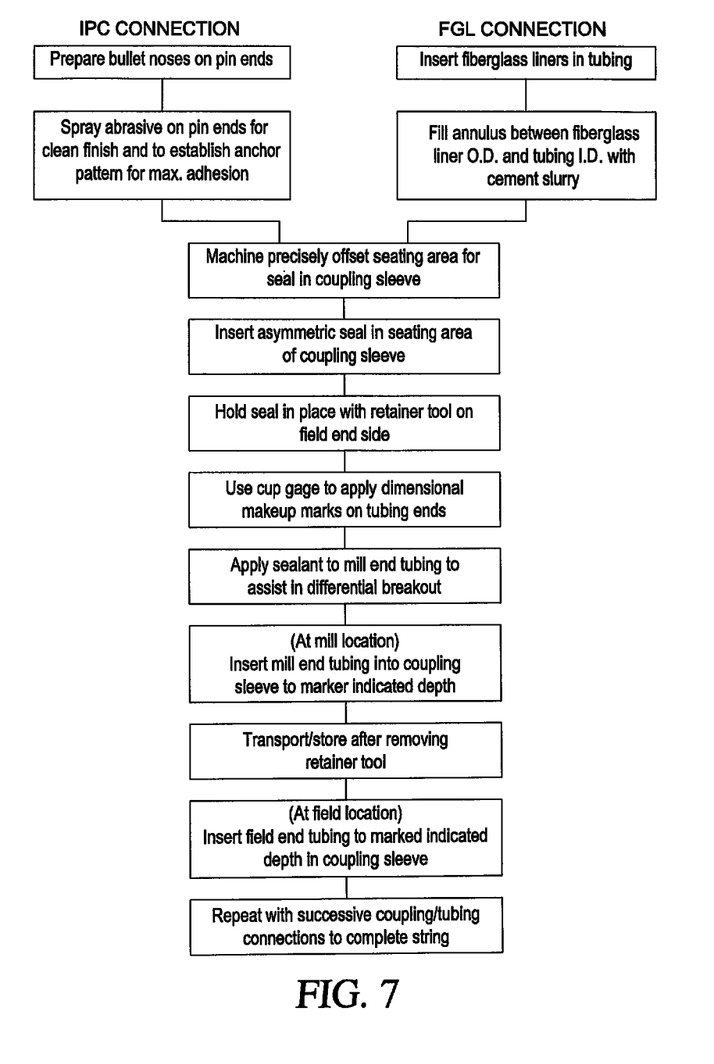
FIG. 7 is a block diagram representation of method steps used in assembling a connection in accordance with the invention.
Figure 8:
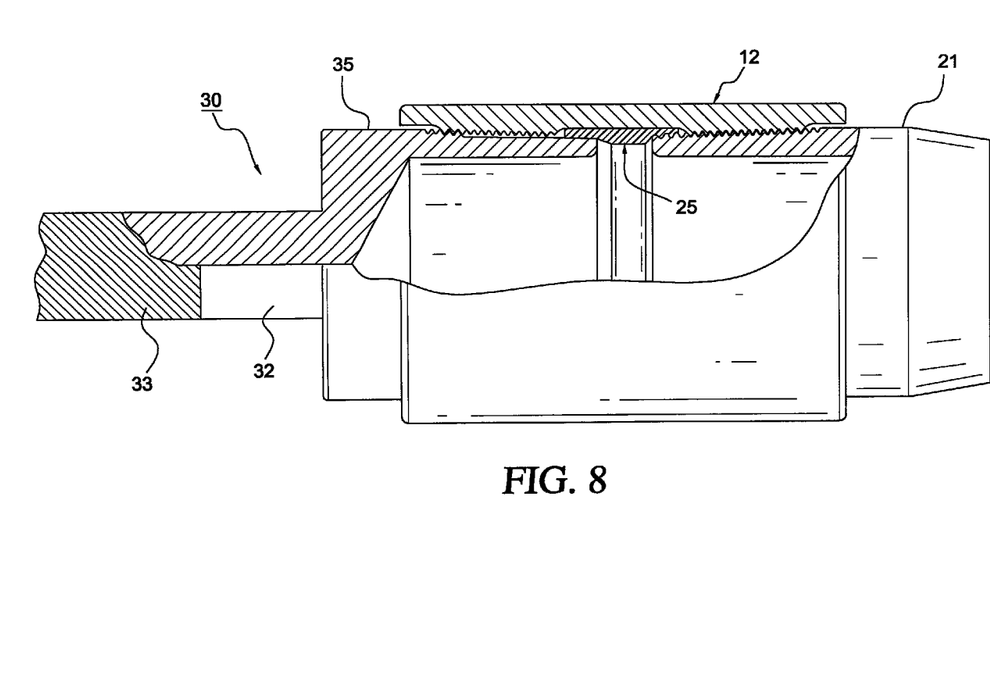
FIG. 8 is a side sectional view of a retainer tool as used in mill end assembly of a coupling configured in accordance with the invention.

In reviewing the following description of installation and use of an IPC [[FGL]] version of a system, reference can also be made to the method steps depicted in FIG. 7. After the installation of the seal ring 25 in proper orientation within the flat surface 14 of the coupling sleeve 12, one pin end 21 is bucked-on in the mill to a selected linear position on the sleeve 12. The position is first measured in known fashion by placing a conventional cup gage (not shown) over the end of the pin 21 to dimensionally define a specific location relative to the threads of the pin end. Using the cup gage, a visible (white) line 0.125" wide is applied to each end of the tubing elements with a steel paint marker pin. These visible lines 31, 32 are depicted separately in outline by dotted lines on the Figures and the marks establish the plant makeup position 31 and the first field makeup position 32 for thread engagement at each end of the tubular product. The reference marks 31, 32 are rapidly installed (requiring little or no additional labor) and only 4-6 seconds per end for an experienced installer. Thereafter, a light coat of "LubeLock Sealant" is applied to the plant makeup pin end threads 24 and also to the internal threads 16 of the plant makeup side of the coupling 12. In bucking on the pin end 21 on the mill side, the forces involved are substantial as the threads of the pin end penetrate into the tapered edge 27 of the seal ring 25. To retain the seal ring 25 in precise position, a retainer tool 35 (FIG. 8) having a concentric tapered end 36 mating within the field end taper 29 on the seal 25 is entered into position within the coupling 12 to retain the seal 25 and to eliminate axial or rotational displacement during powered insertion of the pin end 21.

In the plant or pipe yard, the coupling 12 is then bucked-on to the dimensional position in which the white line 31 that has previously been applied is lined up with the outside shoulder edge of the coupling 12. The "LubeLock Sealant" is of the water activated type, and when cured performs two functions. First, it ensures additional sealing capability and second it provides further adherence of the joined parts, adding an additional 50% increase in breakout torque (relative to a petroleum based thread lubricant). This helps in ensuring that on breakout of a connection at the operating site, the uppermost, or field side of each connection will disengage when the pipe is tripped out of the wellbore.

The material of the seal 25 used in this example is polytetrafluoroethylene ("Teflon"), and here the material is employed without any additional reinforcements or fillers (i.e. as virgin "Teflon"). With the exterior uniform diameter of the seal 25 in engagement against the flat slightly off center ID span 14 of the coupling 12, and with the retainer tool 35 in position, the seal 25 is secured firmly, so when the first pin 21 is bucked-on during makeup at the mill, the first pin end 19 threadedly engages into and resiliently deforms the shorter tapered edge section 27 of the seal 25. This engagement occurs without linear or rotational displacement of the seal 25 as the threads penetrate and displace the "Teflon" seal 25. The angle of the relatively shorter tapered edge 27, and the thickness of its cross-section as the pin end 19 moves in axially, determine the axial length of thread penetration and also the preload initial contact pressure between the seal 25 and the pin end 19. It also determines the displacement volume induced in the "Teflon" as the pin threads are tapped into it, which must be accomplished without crushing the "Teflon" seal material. The "Teflon" seal 25 geometry relative to the displacement volume induced by the intruding pin threads is designed to ensure a range of 15-18% of displacement. This insures proper initial compression of the seal material, aids in assuring shape recovery on breakout of the connection and provides adequate initial contact sealing pressure for future multiple makeup and breakout sequences.

The partially finished connections, comprising multiple separate tubing sections, each paired with a seal and coupling that is precisely and properly attached at the pin mill end, can then be transported to the rig site, directly or after storage in inventory. For the first makeup of connections at the rig site, each pipe is picked up and the second or field pin end is stabbed into the coupling sleeve 12, so that a power tong (not shown) can make up the connection until the previously inscribed 0.125" white line or first field makeup position 32, that was applied at the plant, is in proper position with respect to the coupling sleeve 12. This is when the bottom edge of the line is lined up even with the outside shoulder edge of the attached coupling sleeve 12. In conventional fashion, field end makeups are accomplished using an API modified type thread lubricant. The use of curing or hardening sealants on the field pin ends is not generally required.

When the coupling has been made up to proper dimensional relationships as described above, the connection 10 can later be broken out and made up a number of times, employing the resilient and repeatable deformability of the interior seal 25. For well maintenance or repair, additional makeups and tripping of the pipe require only that the thread lubricant be renewed and that the joints be made up to optimum API torque specifications.

Figure 4:
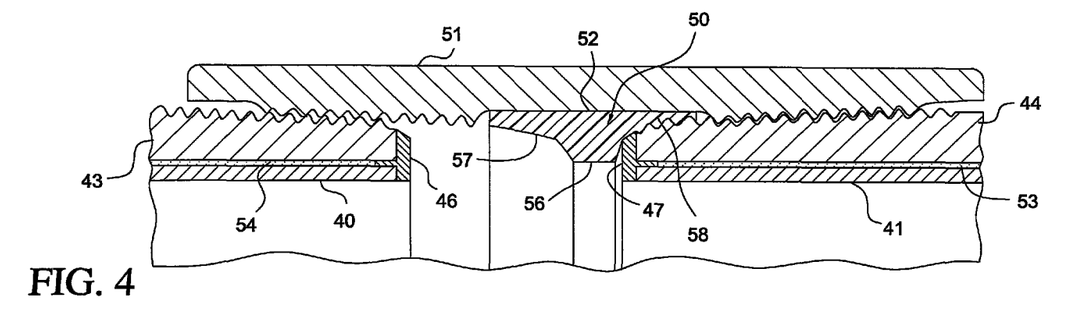
FIG. 4 is a side view, partially in section, of an FGL connection in accordance with the invention.
Figure 5:
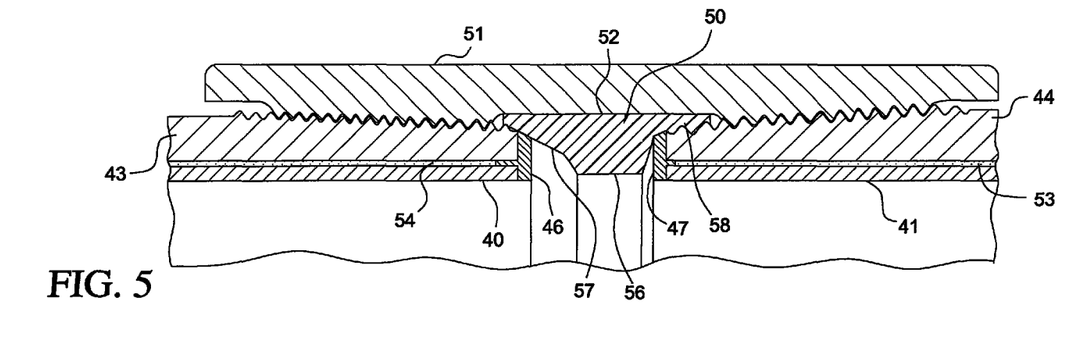
FIGS. 5 and 6 are fragmentary views of successive phases of formation of the FGL connection of FIG. 4.
Figure 6:
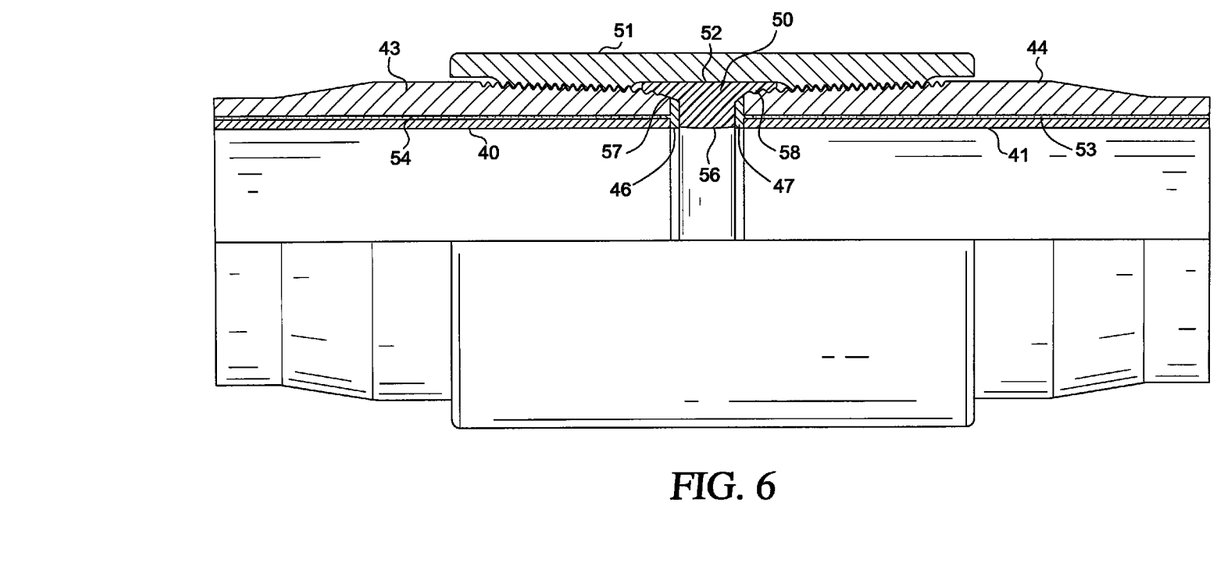

An alternative seal construction in accordance with the invention for use with fiberglass lined pipes is shown in FIGS. 4-6, to which reference is now made. FIG. 4 shows, for introductory purposes, two opposed fiberglass lined tubing sections relative to an intermediate coupling sleeve and central seal in partially assembled form, although in practice the field installation of a pin end is not completed until the mill end tubing is secure. The successive stages leading to complete engagement are illustrated in FIGS. 5 and 6.

The connection of FIGS. 4-6 provides sealing and corrosion barrier protection for API connections using fiberglass lined (FGL) pipe. As in conventional practice, sections of fiberglass liner 40, 41 are incorporated internally in each of the adjacent pipe sections 43, 44 to be substantially longitudinally coextensive therewith. At the ends of the fiberglass liners 40, 41, transverse fiberglass reinforced rings 46, 47 are interposed between the pin ends of the pipe 43, 44 and a central seal 50 which is seated in a uniform approximately central diameter section 52 of the coupling 51. The liner inserts 40, 41 are sealed and secured to the pipe sections 43, 44 by intervening layers of bonding slurry 53, 54 respectively. The central seal 50 has a central inwardly directed ridge 56, and axially extending tapered edges 57, 58 in the field end and mill end sides respectively.

As shown in FIG. 4, the pin end of the mill pipe 44 on the mill end engages into a length of the shorter side tapered edge 58 of the central seal 50, leaving a small gap which can be filled with "Lube Lock" or other sealant to help insure that breakout during later disengagement occurs at the field end side. The longer shallower taper edge section 57, is shown in FIG. 4 as initially seated in the central uniform diameter section of the coupling 51 to await full engagement of the pipe end 43 at the field site. Here, the central ridge 56 on the seal 50 is not yet volumetrically displaced. However, in the field, as the field makeup torque is applied (FIGS. 5 and 6), the field end pin 43 moves into and begins to displace the seal material in the shallower taper end section 57. Consequently, the radial thickness of the seal ridge 56 is displaced inwardly somewhat by the field side pin end 43 as it penetrates into the coupling 51 and the seal 50 (FIG. 5). When the full engagement position is reached for the field end tubing 43, the ridge 56 inner diameter is substantially flush (FIG. 6) with the inner diameter of the fiberglass liners 40, 41.

In this position, the leading edge threads of the field pin end 43 have engaged into and deformed the shallower tapered field edge section 57 of the central seal 50. At consummation of the field end engagement action therefore, (FIG. 6), the inner surface of the pin end 43 on the field side is thus aligned longitudinally with the inner surfaces of the fiberglass ring ends 46, 47 and the inner diameters of the liners 40, 41, while the ridge 56 inner surface is also aligned, so that all interior surfaces are substantially flush and at the same radius from the center line.

Displacement of the material in the seal 50 is limited to the level at which the shape can be recovered after deformation, so that repeated connections of the field end into the coupling 51 can be made. The seal 50 is not permanently deformed or rendered inelastic, thus preserving resilience through a number of repetitive connections. In addition, the full benefits of the fiberglass liner 41 and the associated end rings 46, 47 are retained and their sealing effects are augmented by the action of the seal 50.

Methods in Accordance with the Invention

Referring now to FIG. 7 the pin ends 18, 19 of the tubing elements 20, 21 are typically converted to a "bullet nose" configuration by machining the flat end area at the pin end of the pipe to eliminate 90° sharp angles and to create a smooth radius, particularly where it is desired to apply an even thickness of coating. In the event that a plastic coating is to be incorporated in the pipe, the ID of the pipe is cleaned to white metal by blasting full length with "Garnett"-type abrasive. This establishes an anchor pattern to improve the coating bond. Each pin end is also blasted around the bullet nose, across the stabbing bevel, up to the first 1½ turns of thread, and then the coating is applied, and either air cured or baked in an oven.

Separately from pin end preparation the asymmetric center seal 25 is inserted into the prepared interior constant diameter seating section of the coupling sleeve 12, with its tapered edges properly oriented in the mill end and field end directions. As another preliminary step, the position markers (31, 32 of FIGS. 1-3) have already been precisely placed (as by using a cup gage) on the pin ends (see FIG. 7) to demarcate desired final position in the sleeve. Sealant can be added to the mill end pipe to assure differential break out so that subsequent couplings can be made up while assuring integrity. At the mill, therefore, one pin end can be precisely engaged into the sleeve, to the marker indicated depth.

Usually, an inventory of tubing lengths properly attached to coupling sleeves will be stored in a pipe yard and delivered when requested to a drill site. There, lift equipment is used to stab the field end of a pipe length to be added to an existing string into the upper open end of the coupling sleeve accessible at the top of the string. Power tongs are used to engage the field end of this next section into the sleeve to the marker indicated depth and the coupling is complete.

Implementation of the connections using interior seals in accordance with the invention is of particular importance to improving multiple use capability of coated tubing. This is because the coating process involves both liquid application and heat treatment. The liquid application step causes inevitable flow of some material from thread crests to thread roots, such that the disparity can sometimes vary from a thread crest coating thickness of 0.002" to 0.004", relative to thread roots having coatings of up to 0.025-0.040" thick under the same application. It is often not feasible to avoid damaging coatings of this characteristic because of the stresses induced by makeup and breakout. Consequently, although internally plastic coated pipe is often used, these limitations and problems which usually arise from cracking damage in the plastic coating, are often encountered.

Employing connections incorporating seals in accordance with the present invention, however, markedly diminishes such problems with relatively little penalty in cost and complexity. Connections in accordance with the present invention make full use of the available deformability, resiliency and recovery characteristics of modern materials by virtue of the advantageous design features which militate against internal deformation of seals during makeup and provide a high degree of tolerance for deformation under stress, as well as acceptance of repeated deformation of the seal. The disclosed sealing configuration for tubular goods has inherent economic and operative advantages even without use of precision placement and makeup techniques as discussed above. When the pin ends are engaged into the spaced apart tapered sections of the seal, the resilient deformation of the seal aids in minimizing leakage through the joint, and the effects of internal turbulence.

Although there have been described above and illustrated in the drawings various examples and alternatives in accordance with the invention, it will be appreciated that other variants will suggest themselves to those skilled in the art. Consequently the invention should be recognized as encompassing all expedients and variations within the scope of the appended claims.

The invention claimed is:

1. An oil field connection system for production and injection tubing sections comprising:
   a sleeve coupling having an interior seating span of predetermined axial length and defining a seating surface of substantially constant inner diameter and with the sleeve coupling including oppositely axially extending mill end and field end female threaded sections adjacent to the seating span and both having the same threads;
   a mill end of a first one of the production and injection tubing sections and a field end of a second one of the production and injection tubing sections, each with male thread pin ends configured to be inserted into, and coupled to the respective mill and field end female threaded sections of the sleeve coupling; and
   a deformable seal ring, the seal ring having an outer diameter positioned in the seating span of the sleeve coupling and having an outer surface conforming to the seating surface, the seal ring including an approximately central portion and oppositely extending asymmetric mill end and field end terminal sections which taper at different angles of taper with respect to each other and with mill end and field end terminal section lengths different from each other, the mill end and field end terminal sections each extending longitudinally from the central portion of the seal ring toward respective axial ends of the seal ring, the mill end and field end terminal sections of the seal ring extending to respective positions to be intercepted by starting thread areas of the pin ends of the inserted mill and field ends of the first and second ones of the production and injection tubing sections and being deformed by the starting thread areas of the pin ends of the tubing sections, the field end terminal section of the seal ring being longer than the mill end terminal section of the seal ring, multiple connections of the pin end of the field end of the second one of the production and injection tubing sections with the field end section of the sleeve coupling resulting in increasing penetration of the pin end of the field end of the second one of the production and injection tubing sections into the field end terminal section of the seal ring with each such connection.

2. The oil field connection system as set forth in claim 1 above wherein the seal ring is a deformable synthetic material and the terminal sections are deformed by the first 1½ to 2½ starting thread areas of the male thread pin ends of the mill and field tubing sections.

3. The oil field connection system as set forth in claim 1 above, wherein the mill end terminal section of the seal ring has a first converging taper angle with respect to a longitudinal tubing axis, and which is greater than a field end terminal section second converging taper angle.

4. The oil field connection system as set forth in claim 3 above, wherein the seating span of the sleeve coupling is longitudinally offset from a longitudinal center of the sleeve coupling by a distance to compensate for the different first and second taper angles of the mill end and field end terminal sections of the ring seal.

5. The oil field connection system as set forth in claim 4 above, wherein the deformable seal ring is volumetrically displaced by the inserted male thread pin ends, and wherein the male thread pin ends each penetrate and deform an end of the seal ring to substantially less than a full axial extent of the mill end and field end terminal sections.

6. The oil field connection system as set forth in claim 5 above, wherein the mill and field tubing sections each include applied indicia at predetermined longitudinal spacings from the pin ends and which indicia is usable to demarcate a desired depth of insertion of a pin end into the sleeve coupling, the connection being made up such that the longitudinal indicia are substantially aligned with the longitudinal end of the sleeve coupling.

7. The oil field connection system as set forth in claim 1 above, wherein the pin ends have been machined, wherein the pin ends are plastic coated, and wherein the deformable seal ring is of non-reinforcement Teflon.

8. The oil field connection system as set forth in claim 1 above, wherein the mill and field tubing sections further comprise inner fiber glass liners, the inner fiber glass liners further each including an orthogonally disposed terminal ring of a diametric dimension that exceeds an end diametral thickness of each pin end, and wherein the seal ring has a volume such that when it is deformed by displacement of the mill end and field end terminal sections by the inserted starting thread areas of the pin ends, it is deformed to a shape wherein an inner diameter of the seal ring in the approximately central portion is substantially collinear with an inner diameter of the mill and field end tubing sections.

9. A tubular connection system for oil field production and injection tubing connection applications to connect mill ends and field ends of lengths of production and injection tubular pipes and comprising the combination of:
   a string of the production and injection tubular pipes, each tubular pipe having a tapered male threaded mill pin end and a tapered, male threaded field pin end;
   a series of tubular sleeve couplings for interconnecting pairs of the production and injection tubular pipes in end-to-end relation, to define the string of production and injection tubular pipes, each sleeve coupling having a longitudinal section with a uniform inner diameter forming a seating span and adapted to receive a seal ring, the sleeve couplings and the tubular pipes being disposed along a tubing string axis and each sleeve coupling further including a mill end female threaded section and a field end female threaded section extending from the seating span to a terminal end of the sleeve coupling, the mill end and field end female threaded sections each being configured to mate with one of the threaded pin ends of one the production and injection tubular pipes; and a plurality of resilient seal rings, each having an outer diameter section sized to be positioned within the seating span of a selected one of the series of tubular sleeve couplings and each including an inner diameter received in the seating span that is greater than an inner diameter of the tubular pipes, each resilient seal ring further including integral tapered asymmetric mill end and field end terminal sections extending longitudinally to the tubing string axis, and in opposite directions from the seating span, wherein the mill end terminal section is disposed having a first axial length and with a first taper angle relative to the tubing string axis and being configured to be engaged by the starting thread areas of the mill pin end at the mill end of the connection, and wherein the field end terminal section has a second taper angle less than the first taper angle, and a second axial length longer than the first axial length and being positioned at the field end side of the connection, the tapered mill end and field end terminal sections each being deformed by a leading edge of the starting thread area of the inserted male threaded pin end of the adjacent tubular pipe, and the tubular connection system further including a sealing coating disposed between the mill pin end and the sleeve coupling for augmenting adhesion between the mill end pipe and the sleeve coupling, such that, in use, each connection can be broken and remated during multiple couplings in the field by applying torque to the field end pipe and by removing each field end pipe for later reengagement with, and increased penetration of the starting thread area of the field end pin end into the field end tapered section of each resilient ring seal with each such coupling.

10. A tubing connection for production and injection petroleum well applications in which tubing sections each having male threaded tubing mill and field pin ends are configured to fit into opposite ends of a threaded sleeve coupling, wherein the threaded sleeve coupling has a seating span with an interior axial length of substantially constant interior diameter and defining a seating surface and having mill end and field end female threaded sections positioned to receive terminal portions of male threaded mill and field pin ends of ones of the tubing sections to be connected, and wherein the tubing connection further comprises a deformable seal ring having an outer diameter portion conforming with the seating surface of the sleeve coupling, the seal ring including an asymmetric, differentially longitudinally tapered and a differentially longitudinal length pair of mill end and field end terminal sections extending axially in opposite longitudinal directions with respect to each other from an intermediate region to longitudinal terminal positions of the seal ring such that each terminal section is deformed by starting thread areas of a proximate inserted one of the mill end and field end pin tubing ends and is displaced thereby with no permanent deformation, the field end terminal section of the seal ring being longer than the mill end terminal section of the seal ring to accomplish multiple connections of at least the pin end of the field tubing section with the field end section of the sleeve coupling, with increasing penetration of the starting thread area of the pin end of the field tubing section into the field end terminal section of the ring seal, with each such connection.

11. The tubing connection as set forth in claim 10 above, wherein the asymmetric terminal sections of the seal ring are configured with the mill end terminal section being longitudinally shorter and having a steeper taper than the field end terminal section.

12. The tubing connection as set forth in claim 11 above, wherein engagement of the starting thread area of one of the mill end tubing pin ends into the mill end of the ring seal introduces a first displacement of the mill end tapered section and further wherein a total displacement of the ring seal is greater than the first displacement.

13. The tubing connection as set forth in claim 10 above, wherein the tubing connection further comprises a water setting sealant disposed on the mill end female threaded section of the threaded sleeve coupling, for augmenting adhesion between the male threaded tubing mill pin end and the threaded sleeve coupling for differential breakout at the male threaded tubing field pin end side on repeated breakouts of the field pin end of the tubing section from the threaded sleeve coupling field end terminal section.

14. The tubing connection as set forth in claim 10 above, wherein the tubing sections each include a fiberglass liner, and wherein the deformable seal ring is configured with an inwardly directed central ridge and has a volume such that when the seal ring is deformed by the starting thread areas of the fully inserted tubing mill and field pin ends, the seal ring central ridge deforms to form an internal seal ring diameter that is substantially flush with an inner diameter of the fiberglass liner.

* * * * *